United States Patent
Lin et al.

(10) Patent No.: US 11,249,517 B2
(45) Date of Patent: Feb. 15, 2022

(54) ELECTRONIC APPARATUS AND SCREEN CONTROL METHOD THEREOF

(71) Applicant: Acer Incorporated, New Taipei (TW)

(72) Inventors: Cheng-Wei Lin, New Taipei (TW); Wei-Kuo Shih, New Taipei (TW); Chao-Kuang Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/995,769

(22) Filed: Aug. 17, 2020

(65) Prior Publication Data

US 2021/0318725 A1    Oct. 14, 2021

(30) Foreign Application Priority Data

Apr. 10, 2020  (TW) ................................ 109112105

(51) Int. Cl.
    *G06F 1/16*         (2006.01)
(52) U.S. Cl.
    CPC .......... *G06F 1/1649* (2013.01); *G06F 1/1616* (2013.01); *G06F 1/1681* (2013.01)
(58) Field of Classification Search
    CPC ........ G06F 1/16; G06F 1/1605; G06F 1/1652; G06F 3/011; G06F 3/012; G06F 3/0304; G06F 3/04847; G06F 3/165; G06K 9/00228; H04N 21/44218; H04N 5/44; H04N 5/64; H04N 5/66; G09G 2340/04; G09G 2354/00; G09G 2380/02
    See application file for complete search history.

(56) References Cited

U.S. PATENT DOCUMENTS

| 2014/0354791 | A1* | 12/2014 | Lee | G06F 3/011 |
| | | | | 348/77 |
| 2017/0238901 | A1* | 8/2017 | Henderson | G06F 3/017 |
| 2018/0210504 | A1* | 7/2018 | Moser | G06F 1/1649 |
| 2020/0026078 | A1* | 1/2020 | Lim | G02B 27/0093 |

FOREIGN PATENT DOCUMENTS

| TW | M500408 | 5/2015 |
| TW | 201827980 | 8/2018 |

* cited by examiner

*Primary Examiner* — Nelson M Rosario
(74) *Attorney, Agent, or Firm* — JCIPRNET

(57) ABSTRACT

An electronic apparatus and its screen control method adapted to an electronic apparatus are provided. The electronic apparatus includes a first display screen, a second display screen, and a body. The first display screen is pivotally connected to the body along a first rotation axis, and the second display screen is disposed on an upper surface of the body. The method includes following steps. A sight of a user is detected by a sight sensor. In response to the sight projected on the second display screen at a default position, a screen rotation degree is determined according to a direction of the sight. According to the screen rotation degree, the second display screen is controlled to rotate from the default position along the second rotation axis to a display position, so that a view angle at which the user watches the second display screen satisfies a predetermined condition.

14 Claims, 7 Drawing Sheets

ELECTRONIC APPARATUS AND SCREEN CONTROL METHOD THEREOF

CROSS-REFERENCE TO RELATED APPLICATION

This application claims the priority benefit of Taiwan patent application serial no. 109112105, filed on Apr. 10, 2020. The entirety of the above-mentioned patent application is hereby incorporated by reference herein and made a part of this specification.

BACKGROUND

Technical Field

The disclosure relates to an electronic apparatus, and particularly to an electronic apparatus and a screen control method thereof.

Description of Related Art

With vigorous development of information and communication technologies as well as development of various electronic apparatuses and advancement of their various functions, the electronic apparatuses have become indispensable in daily lives of people. For instance, normal notebook computers are mostly composed of a body and a display screen, and the body and the display screen are pivotally connected to each other. Through relative rotation of the body and the display screen, a user may fold the host and the display screen of the notebook computer for easy portability. When it is intended to use the notebook computer, the display screen is unfolded for operation.

With the increase in the processing amount of information, it becomes more and more difficult for single-screen notebook computers to comply with users' needs. For users of the notebook computers, it is common to use multiple screens to improve work efficiency. Accordingly, in order to meet the users' needs, dual-screen notebook computers have already been present on the market. However, in order to avoid the auxiliary screen from covering the main screen, a display direction of the auxiliary screen is generally fixed, or the user is required to manually adjust the display direction of the auxiliary screen. In this case, the user may watch the auxiliary screen at a poor view angle or need to manually adjust the display direction of the auxiliary screen repeatedly, thereby bringing unpleasant user's experience and causing inconvenience in use.

SUMMARY

The disclosure is directed to an electronic apparatus and a screen control method thereof, which may automatically adjust a display direction of a second display screen in a dual-screen electronic apparatus according to adaptability of a sight of a user, thereby improving image viewing quality and operation convenience.

An embodiment of the disclosure provides a screen control method adapted to an electronic apparatus. The electronic apparatus includes a first display screen, a second display screen, and a body, and the first display screen is pivotally connected to the body along a first rotation axis. The method includes following steps. A sight of a user is detected by a sight sensor. In response to the sight projected on the second display screen at a default position, a screen rotation degree is determined according to a direction of the sight. According to the screen rotation degree, the second display screen is controlled to rotate from the default position along a second rotation axis to a display position, so that a view angle at which the user watches the second display screen satisfies a predetermined condition. Here, the second display screen is disposed on an upper surface of the body.

An embodiment of the disclosure provides an electronic apparatus including a body, a first display screen, a second display screen, a sight sensor, and a processor. The first display screen is pivotally connected to the body along a first rotation axis, and the second display screen is disposed on an upper surface of the body. The processor is coupled to the first display screen, the second display screen, and the sight sensor, and is configured to perform following steps. A sight of a user is detected by the sight sensor. In response to the sight projected on the second display screen at a default position, a screen rotation degree is determined according to a direction of the sight. According to the screen rotation degree, the second display screen is controlled to rotate from the default position along a second rotation axis to a display position, so that a view angle at which the user watches the second display screen satisfies a predetermined condition.

In view of the above, according to one or more embodiments of the disclosure, when the user uses the electronic apparatus with the first display screen and the second display screen, the second display screen may instantly respond to the user's gaze and rotate from the default position to the display position at a proper view angle. Thereby, the user may save the step of manually adjusting the second display screen and watch the second display screen at a proper view angle, thereby greatly improving the convenience of operation.

In order to make the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Some embodiments of the disclosure will be described in detail accompanying with the drawings. The reference numbers provided in the following description represent the same or similar elements in different drawings, and the embodiments are only a part of the disclosure and are not all possible embodiments of the disclosure. To be specific, the embodiments are only examples of apparatuses and methods within the scope of the application provided in the disclosure.

It should be understood that when an element is referred to as being "connected" or "coupled to" another element, it may be directly connected or coupled to another element, or intervening elements may be present. By contrast, when an element is referred to as being "directly connected" or "directly coupled to" another element, there is no intervening elements.

Figure 1:
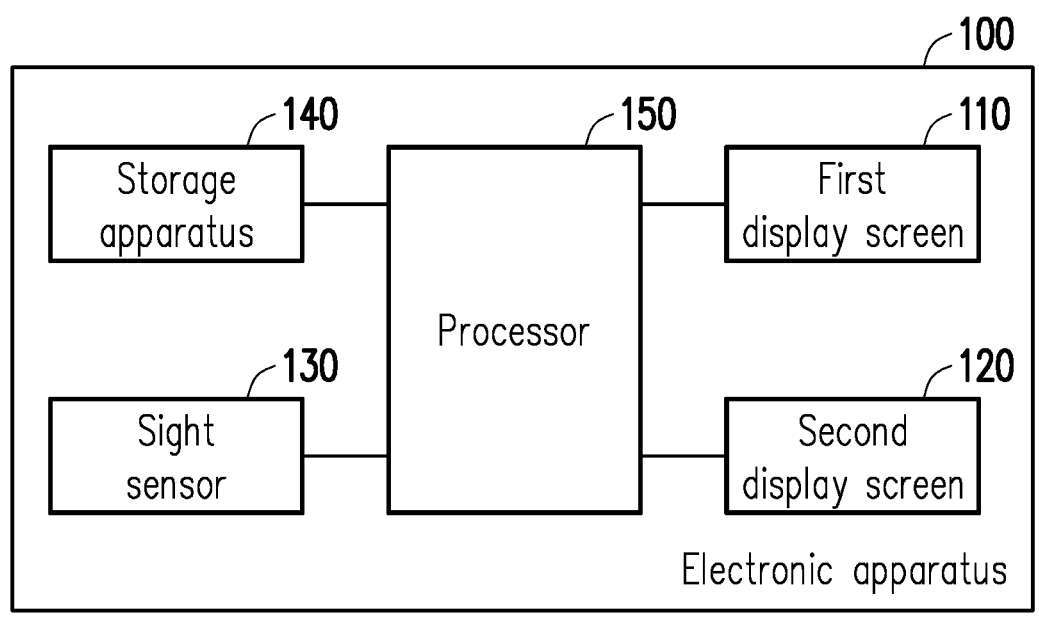
FIG. 1 is a functional block diagram of an electronic apparatus according to an embodiment of the disclosure.

FIG. 1 is a functional block diagram of an electronic apparatus according to an embodiment of the disclosure. With reference to FIG. 1, an electronic apparatus 100 includes a first display screen 110, a second display screen 120, a sight sensor 130, a storage apparatus 140, and a processor 150. The electronic apparatus 100 may be a dual-screen electronic apparatus, such as a notebook computer, an e-book, or a game console, which should not be construed as a limitation in the disclosure.

The first display screen 110 and the second display screen 120 are display apparatuses which provide display functions, such as a liquid crystal display (LCD), a light-emitting diode (LED) display, a field emission display (FED), an organic light-emitting diode (OLED) display, or any other type of display, which should not be construed as a limitation in the disclosure.

The sight sensor 130 is a device that may detect a sight of a user, such as an image sensor or an eye tracker. Specifically, in an embodiment, the sight sensor 130 may include a face image capturing acquisition module for detecting the sight of the user according to the direction toward which the user's face faces and the pupil position of the user through capturing images of the user's face and eyes. In an embodiment, the sight sensor 130 may include a light emitting module and an eye image capturing module. The light emitting module of the sight sensor 130 emits a light beam towards the user's eyes, and the eye image capturing module of the sight sensor 130 takes an eye image. The sight sensor 130 detects the user's pupil position and a bright spot position in the eye image and detects the current sight of the eyes according to the positional correspondence between the pupil position and the bright spot position. The bright spot position is a light reflection spot generating by irradiating the eyes of the user through the light beam emitted by the light emitting module.

The storage apparatus 140 is configured to store data, such as files, images, commands, program codes, software elements, and so on, and the storage apparatus 140 may be, for instance, any type of fixed or movable random access memory (RAM), read only memory (ROM), flash memory, hard disk, other similar devices, integrated circuits, and combinations thereof.

The processor 150 is coupled to the first display screen 110, the second display screen 120, the storage apparatus 140, and the sight sensor 130 to control activation between the components of the electronic apparatus 100, and the processor 150 is, for instance, a central processing unit (CPU) or any other programmable general-purpose or special-purpose microprocessor, digital signal processor (DSP), programmable controller, application specific integrated circuit (ASIC), programmable logic device (PLD), graphics processing unit (GPU), or any other similar device or a combination of these devices. The processor 150 may execute the program codes, software modules, commands, or the like recorded in the storage apparatus 140 to implement the screen control method provided in one or more embodiments of the disclosure.

However, in addition to the first display screen 110, the second display screen 120, the sight sensor 130, the storage apparatus 140, and the processor 150, the electronic apparatus 100 may further include other elements not shown in FIG. 1, such as a mouse, a speaker, a microphone, a keyboard, a communication element, and so on, which should not be construed as a limitation in the disclosure.

Figure 2A:
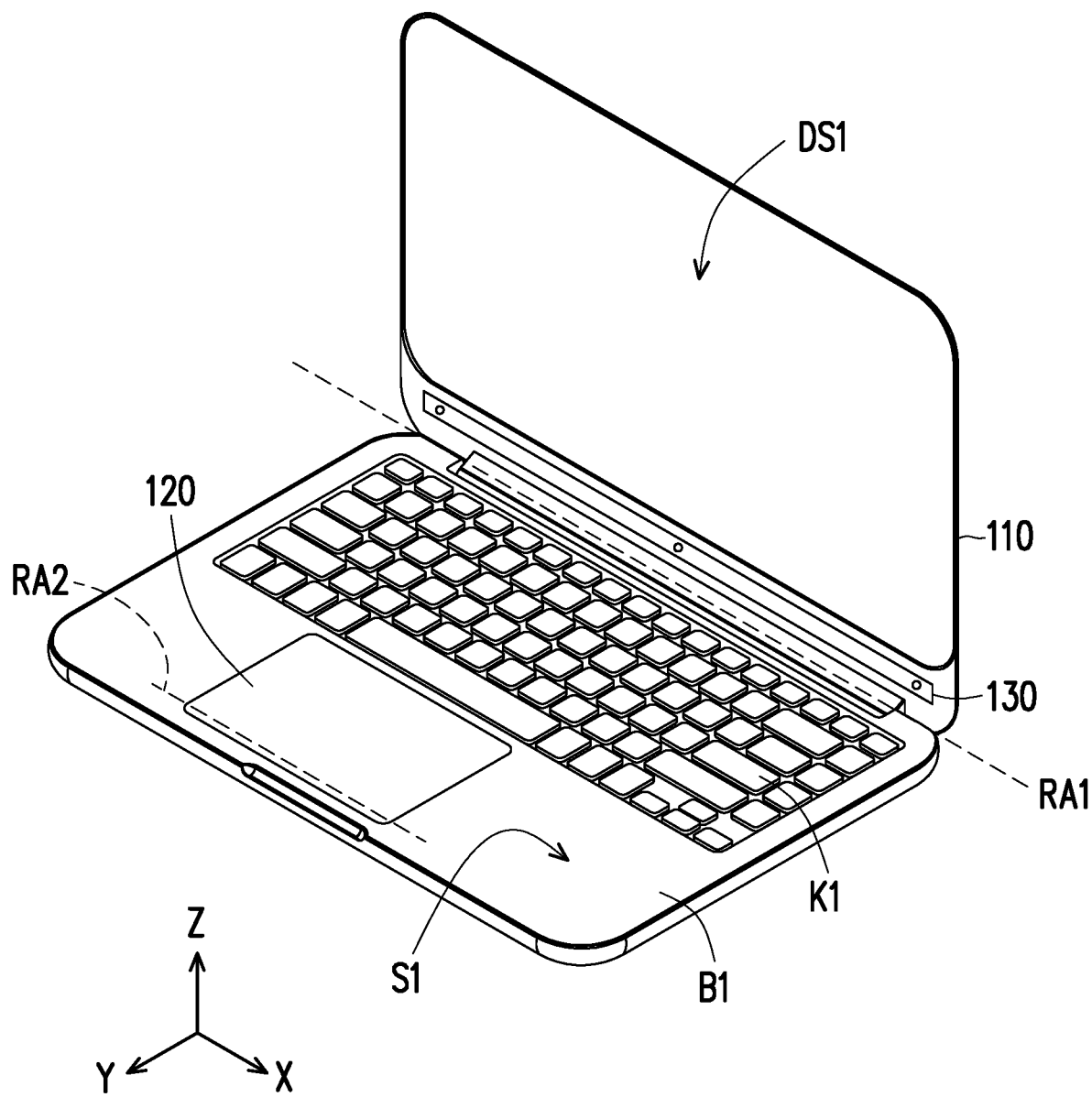
FIG. 2A and FIG. 2B are schematic diagrams of an electronic apparatus according to an embodiment of the disclosure.
Figure 2B:
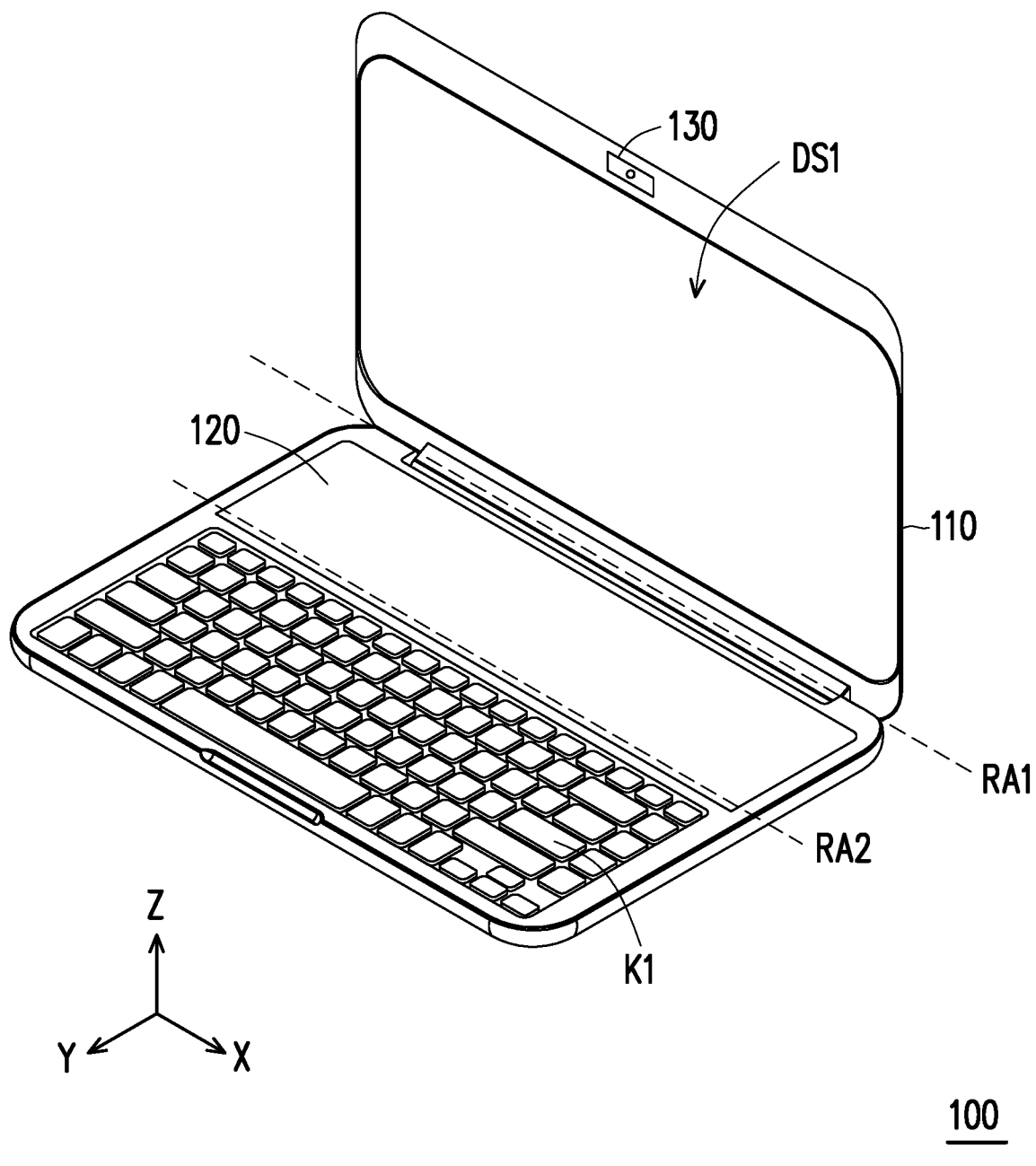

FIG. 2A and FIG. 2B are schematic diagrams of an electronic apparatus according to an embodiment of the disclosure. With reference to FIG. 2A and FIG. 2B, the electronic apparatus 100 may include a body B1 formed by assembling multiple apparatuses, elements, and casings. The first display screen 110 is pivotally connected to one side of the body B1 of the electronic apparatus 100 along a first rotation axis RA1. For instance, the first display screen 110 may be connected to the body B1 through various pivotal rotation mechanisms (e.g., a rotation axle assembly, a hinge assembly, etc.), so that the first display screen 110 may rotate relative to the body B1. When the electronic apparatus 100 is in a folded state, a display plane of the first display screen 110 faces an upper surface S1 of the body B1. It is worth noting that the second display screen 120 is disposed on the upper surface S1 of the body B1. When the electronic apparatus 100 is in an unfolded state, the user may watch the first display screen 110 and the second display screen 120 at the same time. In an embodiment, the second display screen 120 disposed on the body B1 may be implemented in form as a touch screen for providing a touch function.

However, the size of the second display screen 120 and the location where the second display screen 120 is disposed are not limited in the disclosure and may be determined according to actual needs. With reference to FIG. 2A and FIG. 2B, both the second display screen 120 and a keyboard K1 are disposed on the upper surface S1 (also referred to as a keyboard surface) of the body B1. In the embodiment shown in FIG. 2A, the second display screen 120 is located below the keyboard K1. In the embodiment shown in FIG. 2B, the second display screen 120 is located above the keyboard K1.

According to the embodiment depicted in FIG. 2A, note that the sight sensor 130 may be disposed below the first display screen 110. According to the embodiment depicted in FIG. 2B, the sight sensor 130 may be disposed above the first display screen 110. However, FIG. 2A and FIG. 2B are merely exemplary and are not intended to limit the disclosure. The location where the sight sensor 130 is disposed may be determined according to actual needs. In addition, the location of the second display screen 120 on the upper surface S1 may also be determined according to actual needs.

Note that the second display screen 120 may rotate relative to the body B1 along a second rotation axis RA2 (e.g., the second rotation axis RA2 shown in FIG. 2A and FIG. 2B). Accordingly, the second display screen 120 may be switched between a lying state in which the second display screen 120 lies down on the body B1 (as shown in FIG. 2A and FIG. 2B) and an upright state in which the second display screen 120 stands on the body B1. In an embodiment, the second display screen 120 may be switched between the lying state and the upright state according to the sight of the user and rotate from a default position in the lying state to a display position in the upright state. In addition, a screen rotation angle at which the second display screen 120 rotates from the default position to the display position is determined according to the sight of the user.

Figure 3:
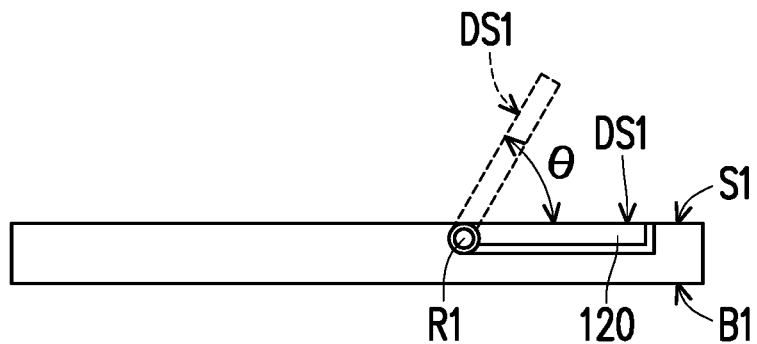
FIG. 3 is a schematic diagram of a second display apparatus located at a default position and a display position according to an embodiment of the disclosure.

In detail, FIG. 3 is a schematic diagram of a second display apparatus located at a default position and a display position according to an embodiment of the disclosure. With reference to FIG. 3, the second display screen 120 may be disposed in a groove of the body B1 via a controllable pivotal rotation mechanism R1 (such as a motor, a pneumatic cylinder, a rotation axle assembly, a hinge assembly, or the like). When the second display screen 120 is located at the default position, the display plane DS1 of the second display screen 120 is substantially parallel to the upper surface S1 of the body B1. When it is detected that the sight of the user is projected on the second display screen 120, the second display screen 120 rotates to the display position along the second rotation axis RA2 and stands upright. When the second display screen 120 is located at the display position in the upright state, there is an angle θ between the display plane DS1 of the second display screen 120 and the upper surface S1 of the body B1. Here, the screen rotation angle at which the second display screen 120 rotates from the default position to the display position is the angle θ between the display plane DS1 of the second display screen 120 and the upper surface S1 of the body B1. In addition, when the second display screen 120 is in the upright state, a display direction of the second display screen 120 may be dynamically adjusted according to the sight. That is, the display position of the second display screen 120 may be dynamically adjusted according to the sight.

Figure 4:
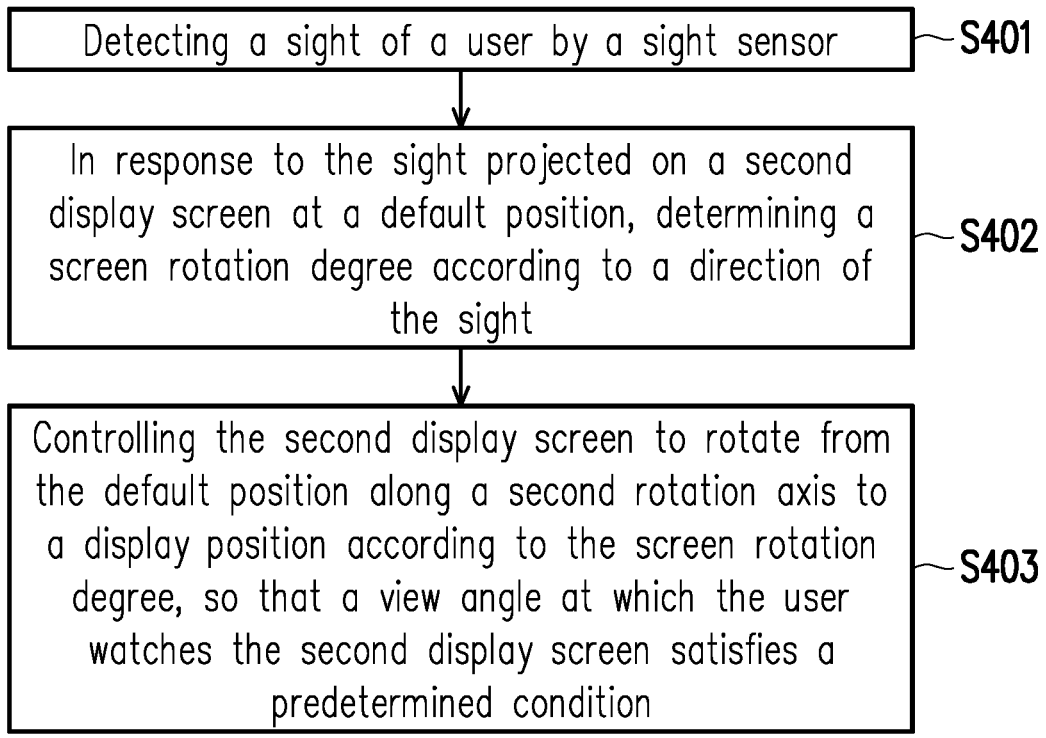
FIG. 4 is a flowchart of a screen control method according to an embodiment of the disclosure.

FIG. 4 is a flowchart of a screen control method according to an embodiment of the disclosure. With reference to FIG. 4, the method provided in the embodiment is adapted to the electronic apparatus 100 described in the previous embodiments, and the detailed steps of controlling the second display screen 120 according to the sight of the user are explained hereinafter with reference to the various elements in the electronic apparatus 100.

In step S401, the processor 150 detects the sight of the user by the sight sensor 130. The processor 150 may obtain information of the sight through the sight sensor 130. The information of the sight may include the direction of the sight, the position information of the eyes of the user, the direction toward which the user's face faces, the pupil position of the user, and so on. In an embodiment, the direction of the sight may include a vector relative to a reference coordinate system (e.g., the world coordinate system), and the position information of the eyes may be the coordinate locations relative to the reference coordinate system.

In step S402, in response to the sight projected on the second display screen 120 at the default position, the processor 150 determines the screen rotation degree according to the direction of the sight. Specifically, when the second display screen 120 lies down on the body B1, the processor 150 may determine whether the sight is projected on the second display screen 120 at the default position according to the information of the sight. When the sight is projected on the second display screen 120 at the default position, the processor 150 determines the screen rotation angle associated with the second display screen 120 according to the information of the sight. Here, in order to allow the user to watch the second display screen 120 at a better view angle, the processor 150 may calculate the screen rotation angle at which the second display screen 120 rotates according to a predetermined ideal view angle and the direction of the sight. The predetermined ideal view angle is, for instance, 90 degrees, 85 degrees, or any other predetermined parameter values according to actual needs. Alternatively, the processor 150 may look up a table according to the direction of the sight to obtain the corresponding screen rotation angle.

In step S403, the processor 150 controls the second display screen 120 to rotate from the default position along the second rotation axis RA2 to the display position according to the screen rotation degree, so that the view angle at which the user watches the second display screen 120 satisfies a predetermined condition. Specifically, after the second display screen 120 is controlled to rotate from the default position along the second rotation axis RA2 to the display position according to the screen rotation degree, the view angle at which the user watches the second display screen 120 (i.e., the angle between the direction of the sight of the user and the display plane of the second display screen 120) is approximately equal to the predetermined ideal view angle.

Figure 5A:
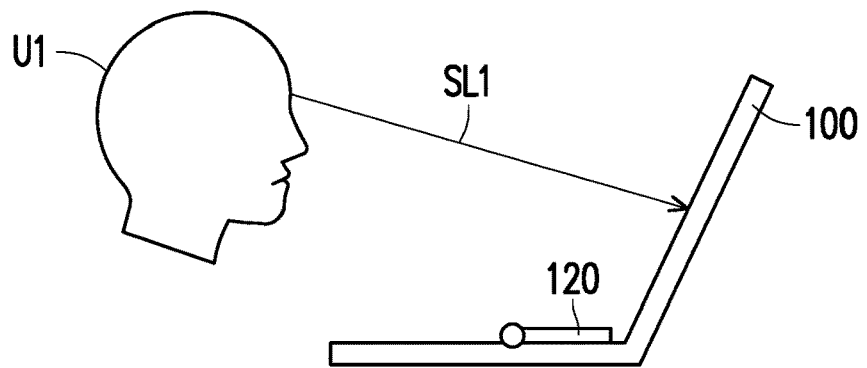
FIG. 5A to FIG. 5C are schematic diagrams of adjusting a display direction of the second display screen according to an embodiment of the disclosure.
Figure 5B:
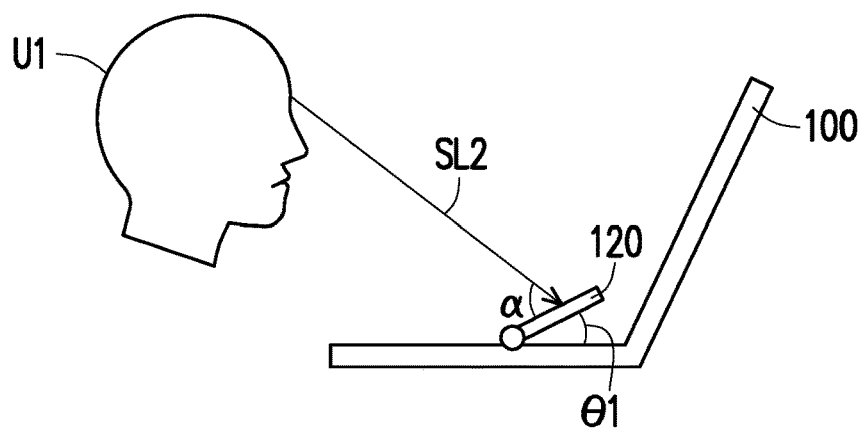
Figure 5C:
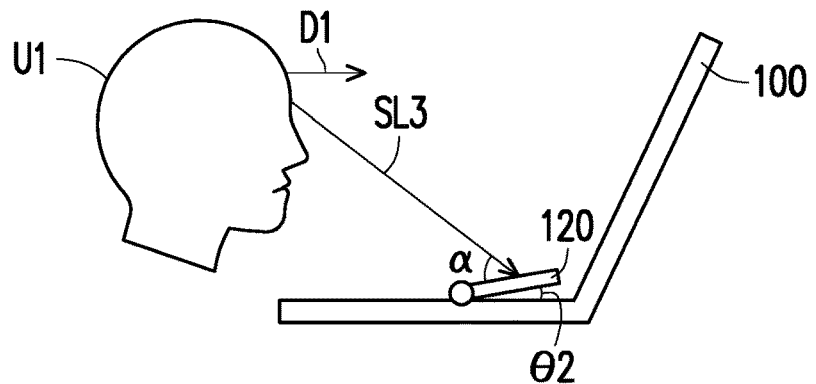

FIG. 5A to FIG. 5C are schematic diagrams of adjusting a display direction of the second display screen according to an embodiment of the disclosure. With reference to FIG. 5A, when the sight SL1 of the user U1 is projected on the first display screen 110 but is not projected on the second display screen 120, the second display screen 120 is controlled to be located at the default position, i.e., lying down on the body B1. With reference to FIG. 5B, when the sight SL2 of the user U1 is converted to be projected on the second display screen 120, the electronic apparatus 100 may determine the screen rotation angle θ1 according to the sight SL2, and the second display screen 120 rotates to the display position according to the screen rotation angle θ1, so that the view angle α at which the user U1 watches the second display screen 120 may be substantially equal to the predetermined ideal view angle. When the second display screen 120 is located at the display position, the screen rotation degree θ1 is the angle between the display plane of the second display screen 120 and the upper surface S1 of the body B1. With reference to FIG. 5C, when the user U1 moves to another watching position in a moving direction D1 approaching the second display screen 120, the electronic apparatus 100 may determine the screen rotation angle θ2 according to the sight SL3, and the second display screen 120 rotates to another display position according to the screen rotation angle θ2, so that the view angle α at which the user U1 watches the second display screen 120 may be substantially equal to the predetermined ideal view angle.

Accordingly, in one or more embodiments of the disclosure, the display direction of the second display screen 120 may be automatically and dynamically adjusted according to the sight of the user. Therefore, when the user watches the first display screen 110, the display image of the first display screen 110 is not blocked by the second display screen 120. When the user watches the second display screen 120, the user may watch the second display screen 120 at an ideal view angle to obtain good watching experience.

However, the implementation manner provided in the disclosure is not limited to the above, and the contents of the previous embodiments may be properly modified according to actual needs. For instance, in another embodiment of the disclosure, the electronic apparatus may also adjust the display direction of the second display screen 120 according to sights of multiple users, so that the difference in the view angles at which the users watch the second display screen 120 may be mitigated, and that the users may obtain similar watching experience. Another embodiment is provided below for elaboration.

Figure 6:
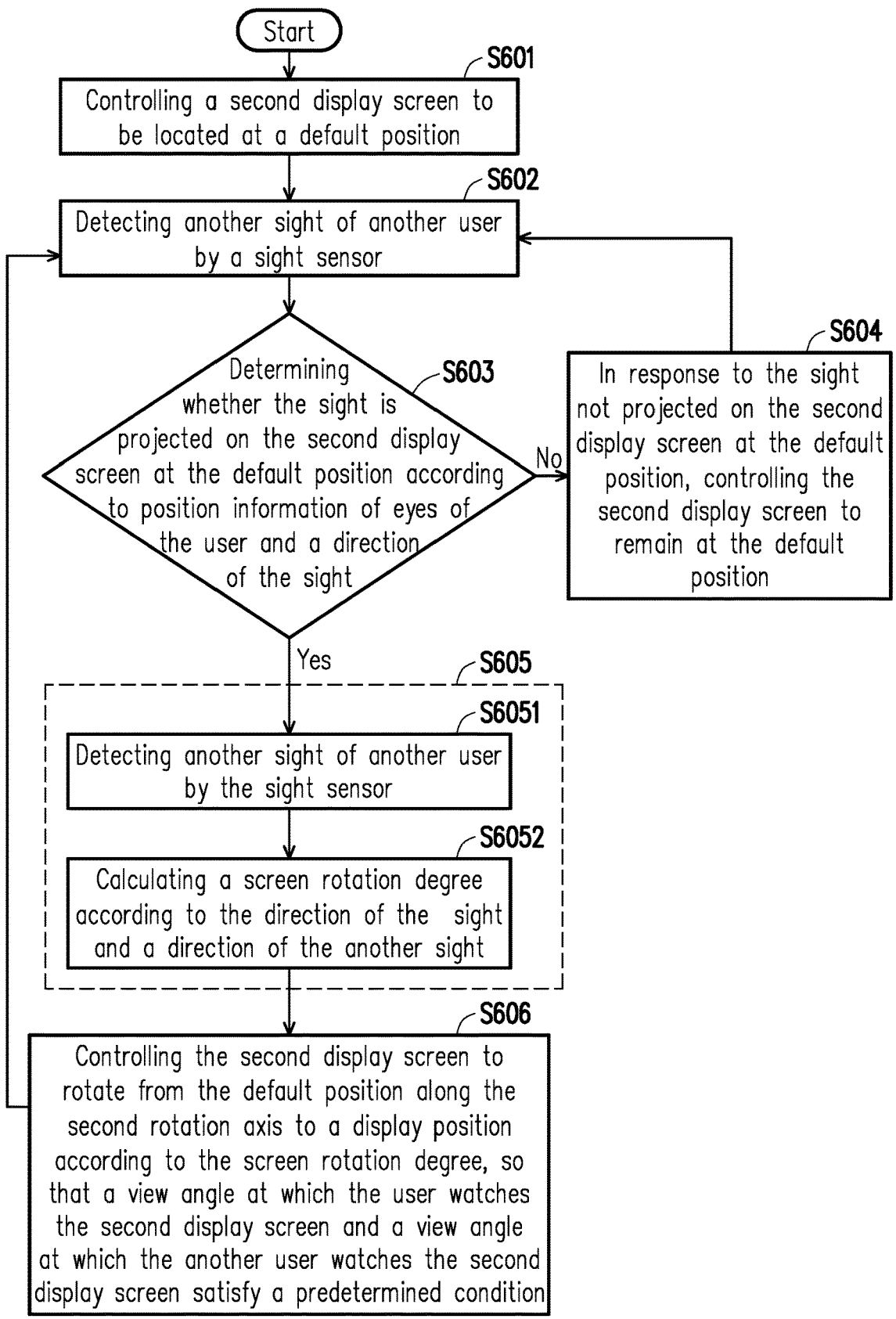
FIG. 6 is a flowchart of a screen control method according to an embodiment of the disclosure.

FIG. 6 is a flowchart of a screen control method according to an embodiment of the disclosure. With reference to FIG. 6, the method provided in the embodiment is adapted to the electronic apparatus 100 described in the previous embodiments, and the detailed steps of controlling the second display screen 120 according to the sight of the user are explained hereinafter with reference to the various elements in the electronic apparatus 100.

In step S601, the processor 150 controls the second display screen 120 to be located at the default position. In step S602, the processor 150 detects the sight of the user by the sight sensor 130. In step S603, when the second display screen 120 is located at the default position, according to the position information of the eyes of the user and the direction of the sight, the processor 150 determines whether the sight is projected on the second display screen 120 at the default position. In a reference coordinate system provided in an embodiment, the processor 150 may determine whether the sight of the user points at the display range of the second display screen 120 located at the default position according to the coordinate position of the eye and the vector of the sight (i.e., the direction of the sight). Said display range corresponds to a range of a specific area on a reference plane (e.g., the upper surface S1 of the body B1) in the reference coordinate system.

If the determination result in step S603 is negative, in step S604, in response to the sight not projected on the second display screen 120 at the default position, the processor 150 controls the second display screen 120 to remain at the default position. Therefore, it may be concluded that when the sight is projected on the first display screen 110, the processor 150 controls the second display screen 120 to remain at the default position. If the determination result in step S603 is positive, in step S605, in response to the sight projected on the second display screen 120 at the default position, the processor 150 determines the screen rotation degree according to the direction of the sight. In the embodiment, step S605 may be implemented as sub-steps S6051 and S6052. In sub-step S6051, the processor 150 detects another sight of another user by the sight sensor 130. In sub-step S6052, the processor 150 calculates the screen rotation degree according to the direction of the sight and the direction of the another sight.

In an embodiment, the processor 150 may perform a weighted calculation based on first weight information of the user, second weight information of the another user, the direction of the sight of the user, and the direction of the another sight of the another user, so as to obtain a screen rotation degree. For instance, the processor 150 may calculate the first screen rotation degree according to the direction of the sight of the user and calculate the second screen rotation degree according to the direction of the another sight of the another user. The processor 150 then performs the weighted calculation based on the first screen rotation degree, the second screen rotation degree, the first weight information of the first screen rotation degree, and the second weight information of the second screen rotation degree to calculate the final screen rotation degree. For instance, if the first screen rotation degree corresponding to the main user is assumed to be 30 degrees, the second screen rotation degree corresponding to the another user is assumed to be 50 degrees, the first weight information is assumed to be 0.7, and the second weight information is assumed to be 0.3, then the processor 150 may calculate the screen rotation degree to be 36 degrees (30*0.7+50*0.3=36).

In an embodiment, the processor 150 may determine the first weight information based on a distance between the user and the second display screen 120 and determine the second weight information based on a distance between the another user and the second display screen 120. For instance, the processor 150 may determine the corresponding weight information according to the distance between multiple users and the second display screen 120 through looking up a table or performing a functional calculation, and the distance between these users and the second display screen 120 may be obtained by any feasible distance measurement technology, which should not be construed as a limitation in the disclosure. For instance, based on a distance ratio between the distance between the user and the second display screen 120 and the distance between the another user and the second display screen 120, the processor 150 may determine the first weight information and the second weight information accordingly.

On the other hand, the above description should be not construed as limitations in the disclosure. In other embodiments, the processor 150 may determine the screen rotation degree for rotating the second display screen 120 based on the sights of multiple users according to other calculation processes. For instance, the processor 150 may calculate a reference direction of the sight based on the two directions of the sights of two users and then determine the screen rotation angle based on the reference direction of the sight and the predetermined ideal view angle.

In the embodiment shown in FIG. 6, if the sight of the main user is projected on the second display screen 120, the processor 150 then detects another sight of another user by the sight sensor 130, so as to adjust the display direction of the second display screen according to the sights of multiple users. Otherwise, if the sight of the main user is not projected on the second display screen 120, the processor 150 does not detect the sight of any other user by the sight sensor 130 neither rotates the second display screen 120 to be in the display state. In an embodiment, when there are multiple users, the processor 150 may detect the distance between these users and the electronic apparatus 100 to determine the main user.

In step S606, the second display screen 120 is controlled to rotate from the default position along the second rotation axis to the display position according to the screen rotation degree, so that the view angle at which the user watches the second display screen 120 and the view angle at which the another user watches the second display screen 120 meets a predetermined condition. Thereby, the difference between the view angle at which the user watches the second display screen 120 and the view angle at which the another user watches the second display screen 120 may be mitigated to avoid significant difference in the display information acquired from the second display screen 120 by the multiple users.

Figure 7:
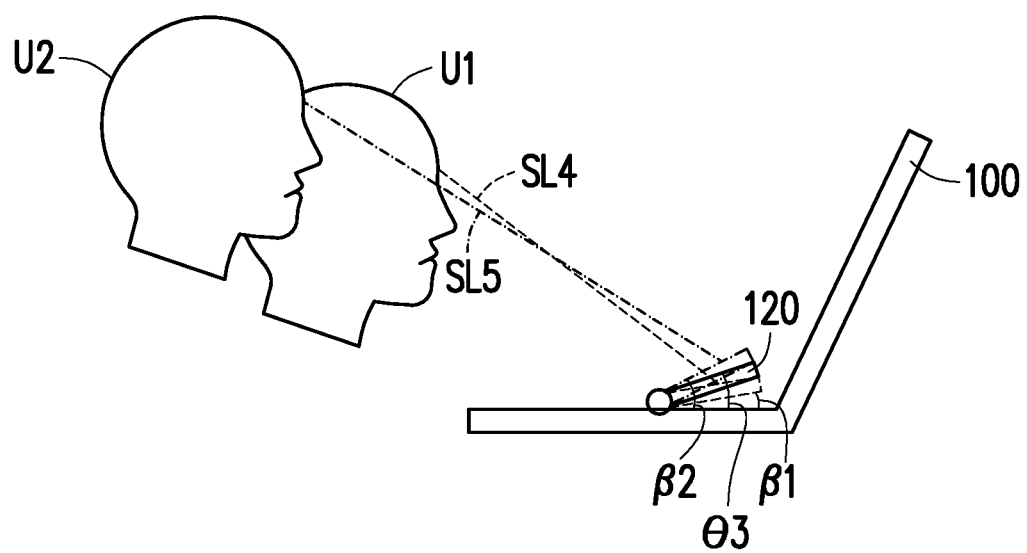
FIG. 7 is a schematic diagram of adjusting the display direction of the second display screen according to an embodiment of the disclosure.

FIG. 7 is a schematic diagram of adjusting the display direction of the second display screen according to an embodiment of the disclosure. With reference to FIG. 7, when the sight SL4 of the user U1 is projected on the second display screen 120, the electronic apparatus 100 may determine the first screen rotation angle $\beta 1$ according to the sight SL4 and determine the second screen rotation angle $\beta 2$ according to another sight SL5 of another user SL2. Next, the electronic apparatus 100 may determine the screen rotation angle $\theta 3$ by performing an average calculation, a weighted calculation, or other functional calculations according to the first screen rotation angle $\beta 1$ and the second screen rotation angle $\beta 2$, and the second display screen 120 rotates to the display position according to the screen rotation angle $\theta 3$. As a result, the view angle at which the user U1 watches the second display screen 120 and the view angle at which another user U2 watches the second display screen 120 may be approximate to the predetermined ideal view angle as much as possible.

To sum up, according to one or more embodiments of the disclosure, in response to the sight of the user projected on the second display screen located at the default position, the second display screen may rotate to the display position according to the screen rotation angle, so that the view angle at which the user watches the second display screen may be more approximate to the ideal view angle. Therefore, when the user watches the first display screen, the display content of the first display screen display is not covered by the second display screen. When the user watches the second display screen, the degree of distortion of the display content of the second display screen is small, and the user is not required to manually adjust the display direction of the second display screen, which may greatly improve the convenience of operation and the user's watching experience. In addition, the display direction of the second display screen may be adjusted according to the sights of multiple users, so as to avoid significant difference in the display information acquired from the second display screen by the multiple users.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A screen control method adapted to an electronic apparatus, the electronic apparatus comprising a first display screen, a second display screen, and a body, the first display screen being pivotally connected to the body along a first rotation axis, the screen control comprising:
   detecting a sight of a user by a sight sensor;
   in response to the sight projected on the second display screen at a default position, determining a screen rotation degree according to a direction of the sight; and
   controlling the second display screen to rotate from the default position along a second rotation axis to stand on the body according to the screen rotation degree, so that a view angle at which the user watches the second display screen satisfies a predetermined condition,
   wherein the second display screen is disposed on an upper surface of the body,
   wherein the screen rotation degree is an angle between a display plane of the second display screen and the upper surface of the body.

2. The screen control method according to claim 1, wherein when the second display screen is located at the default position, a display plane of the second display screen is parallel to the upper surface of the body.

3. The screen control method according to claim 1, wherein the step of determining the screen rotation degree according to the direction of the sight in response to the sight projected on the second display screen at the default position comprising:
   when the second display screen is located at the default position, determining whether the sight is projected on the second display screen at the default position according to position information of eyes of the user and the direction of the sight; and
   in response to the sight projected on the second display screen at the default position, calculating the screen rotation degree according to a predetermined ideal view angle and the direction of the sight.

4. The screen control method according to claim 1, further comprising:
   in response to the sight not projected on the second display screen at the default position, controlling the second display screen to remain at the default position.

5. The screen control method according to claim 1, wherein the step of determining the screen rotation degree according to the direction of the sight comprises:
   detecting another sight of another user by the sight sensor; and
   calculating the screen rotation degree according to the direction of the sight and a direction of the another sight.

6. The screen control method according to claim 5, wherein the step of calculating the screen rotation degree according to the direction of the sight and the direction of the another sight comprises:
   performing a weighted calculation according to first weight information of the user, second weight information of the another user, the direction of the sight, and the direction of the another sight to obtain the screen rotation degree.

7. The screen control method according to claim 6, further comprising:
   determining the first weight information according to a distance between the user and the second display screen, and determining the second weight information according to a distance between the another user and the second display screen.

8. An electronic apparatus, comprising:
   a body;
   a first display screen, pivotally connected to the body along a first rotation axis;
   a second display screen, disposed on an upper surface of the body;
   a sight sensor;
   a processor, coupled to the first display screen, the second display screen, and the sight sensor and configured to:
   detect a sight of a user by the sight sensor;
   in response to the sight projected on the second display screen at a default position, determine a screen rotation degree according to a direction of the sight; and
   control the second display screen to rotate from the default position along a second rotation axis to stand on the body according to the screen rotation degree, so that a view angle at which the user watches the second display screen satisfies a predetermined condition,
   wherein the screen rotation degree is an angle between a display plane of the second display screen and the upper surface of the body.

9. The electronic apparatus according to claim 8, wherein when the second display screen is located at the default position, a display plane of the second display screen is parallel to the upper surface of the body.

10. The electronic apparatus according to claim 8, wherein the processor is further configured to:
   when the second display screen is located at the default position, determine whether the sight is projected on the second display screen at the default position according to position information of eyes of the user and the direction of the sight; and
   in response to the sight projected on the second display screen at the default position, calculate the screen rotation degree according to a predetermined ideal view angle and the direction of the sight.

11. The electronic apparatus according to claim 8, wherein the processor is further configured to:
in response to the sight not projected on the second display screen at the default position, control the second display screen to remain at the default position.

12. The electronic apparatus according to claim 8, wherein the processor is further configured to:
detect another sight of another user by the sight sensor; and
calculate the screen rotation degree according to the direction of the sight and a direction of the another sight.

13. The electronic apparatus according to claim 12, wherein the processor is further configured to:
perform a weighted calculation according to first weight information of the user, second weight information of the another user, the direction of the sight, and the direction of the another sight to obtain the screen rotation degree.

14. The electronic apparatus according to claim 13, wherein the processor is further configured to:
determine the first weight information according to a distance between the user and the second display screen, and determine the second weight information according to a distance between the another user and the second display screen.

* * * * *